(12) United States Patent
Tsutsumi et al.

(10) Patent No.: US 12,083,727 B2
(45) Date of Patent: Sep. 10, 2024

(54) CONTROL DEVICE FOR INJECTION MOLDING MACHINE, AND CONTROL METHOD FOR INJECTION MOLDING MACHINE

(71) Applicant: SUMITOMO HEAVY INDUSTRIES, LTD., Tokyo (JP)

(72) Inventors: Yutaka Tsutsumi, Chiba (JP); Daigo Hotta, Chiba (JP); Shun Shibuya, Chiba (JP); Yuki Matsui, Chiba (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 3 days.

(21) Appl. No.: 18/055,477

(22) Filed: Nov. 15, 2022

(65) Prior Publication Data

US 2023/0173727 A1 Jun. 8, 2023

(30) Foreign Application Priority Data

Dec. 8, 2021 (JP) .................................. 2021-199207

(51) Int. Cl.
*B29C 45/76* (2006.01)
(52) U.S. Cl.
CPC .............. *B29C 45/7653* (2013.01); *B29C 2945/76016* (2013.01); *B29C 2945/76224* (2013.01);
(Continued)
(58) Field of Classification Search
CPC ...... B29C 45/7653; B29C 2945/76016; B29C 2945/76224; B29C 2945/76505; B29C 2945/76702; B29C 45/76; B29C 45/766; B29C 45/768; B29C 45/77; B29C 45/80; B29C 2945/76006; B29C 2945/76013; B29C 2945/7602; B29C 2945/76083; B29C 2945/76096; B29C 2945/76234; B29C 2945/76381; B29C 2945/76384; B29C 2945/76391; B29C 2945/76498; B29C 2945/76568; B29C 2945/76709;
(Continued)

(56) References Cited

U.S. PATENT DOCUMENTS 5,540,577 A 7/1996 Ishikawa et al.
5,756,019 A 5/1998 Nakazawa et al.
(Continued)

FOREIGN PATENT DOCUMENTS

DE 69422681 11/2000
DE 102012018749 4/2013
(Continued)

*Primary Examiner* — Alicia M. Choi
(74) *Attorney, Agent, or Firm* — IPUSA, PLLC

(57) ABSTRACT

A technique for providing assistance in setting the time to increase the clamping force is provided. A control device of an injection molding machine includes a clamping control part and a monitoring part. The clamping control part is configured to change, in a filling step of filling the inside of a mold device with a molding material during clamping, a set value of clamping force from a first set value to a second set value that is larger than the first set value, at a predetermined pressurizing timing in the middle of the filling step. The monitoring part is configured to monitor changes in the actual value of the clamping force due to changes in the set value of the clamping force.

14 Claims, 7 Drawing Sheets

(52) U.S. Cl.
CPC ............... *B29C 2945/76505* (2013.01); *B29C 2945/76702* (2013.01)

(58) Field of Classification Search
CPC ........... B29C 2945/76859; B29C 2945/76869; B29C 2945/76936; B29C 2945/76943; B29C 45/561
See application file for complete search history.

(56) References Cited

U.S. PATENT DOCUMENTS

| | | | | |
|---|---|---|---|---|
| 5,906,777 | A | * | 5/1999 | Kamiguchi ............. B29C 45/80 425/149 |
| 2004/0081717 | A1 | * | 4/2004 | Marazita ............. B29C 45/7653 425/557 |
| 2008/0206382 | A1 | * | 8/2008 | Yokoyama ............ B29C 45/844 425/149 |
| 2010/0109182 | A1 | * | 5/2010 | Kudo .................. B29C 45/7653 264/40.5 |
| 2015/0202815 | A1 | * | 7/2015 | Murata ................... B29C 45/76 425/149 |
| 2016/0236392 | A1 | * | 8/2016 | Aoyama ............... B29C 45/768 |
| 2022/0203592 | A1 | * | 6/2022 | Yoda ....................... B29C 45/04 |

FOREIGN PATENT DOCUMENTS

| | | | |
|---|---|---|---|
| JP | H08-034041 | | 2/1996 |
| JP | 11165336 | A * | 6/1999 |
| JP | 2001287252 | A * | 10/2001 |
| JP | 2004330479 | A * | 11/2004 |
| JP | 2019-093576 | | 6/2019 |
| JP | 2019093576 | A * | 6/2019 |
| TW | 202043002 | A * | 12/2020 |

* cited by examiner

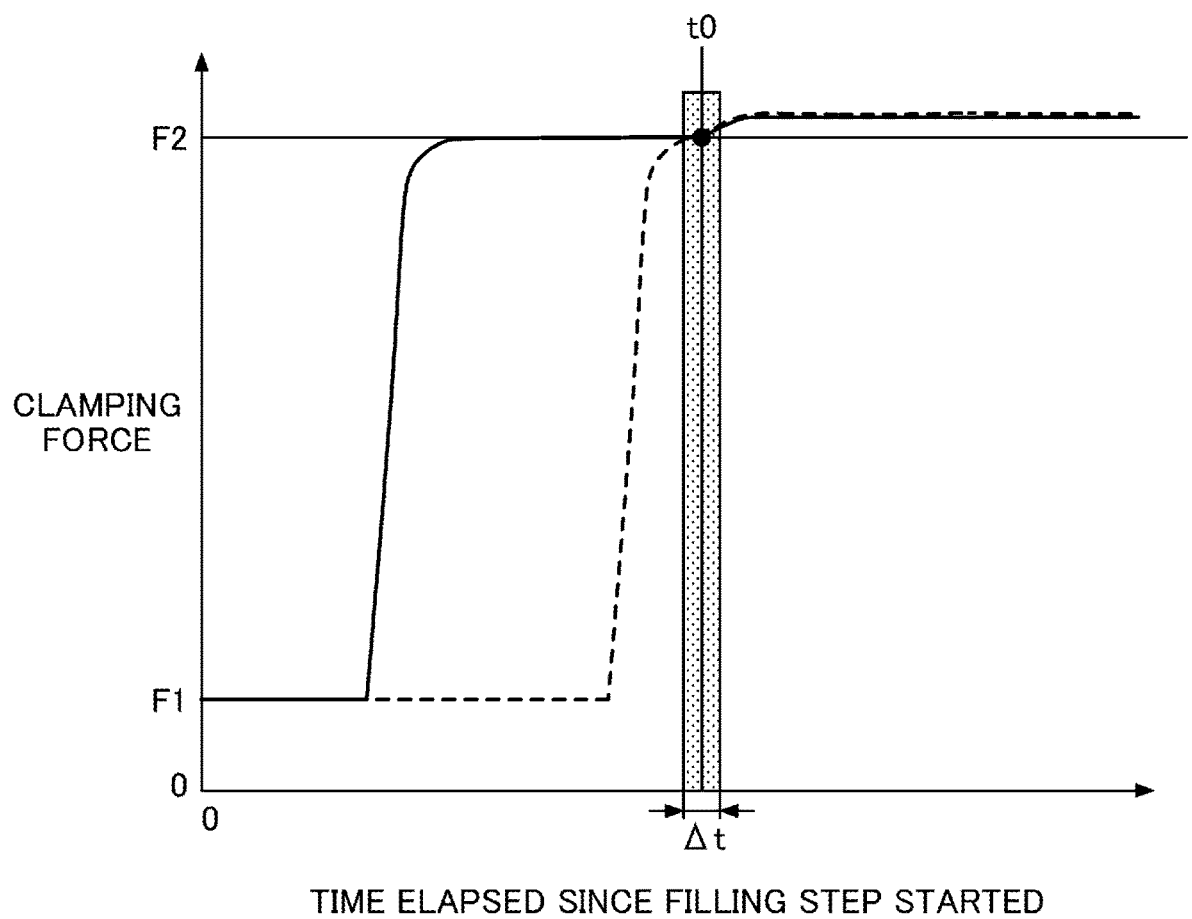

CONTROL DEVICE FOR INJECTION MOLDING MACHINE, AND CONTROL METHOD FOR INJECTION MOLDING MACHINE

CROSS-REFERENCE TO RELATED APPLICATION

This application claims priority to Japanese Patent Application No. 2021-199207, filed on Dec. 8, 2021, the entire contents of which are incorporated herein by reference.

BACKGROUND

1. Field of the Invention

The present invention relates to a control device for an injection molding machine and a control method for an injection molding machine.

2. Description of the Related Art

A composite-type resin molding device disclosed in related art has a press part and an injection part. The press part includes a base, a plurality of driving parts installed in the base, and a slide driven by the plurality of driving parts. A mold part is attached to the press part. The mold part includes an upper mold part attached to the slide, and a lower mold part mounted on the base. In a state in which the press part positions the slide such that a small gap is formed between the upper mold part and the lower mold part, the injection part injects the material into the mold part. When the injection part injects the material into the mold part, if there is a part in the slide where the load applied from below by the material is greater than the load applied from the driving part, that part of the slide tries to escape upward.

SUMMARY

A control device for an injection molding machine according to one aspect of the present invention has a clamping control part and a monitoring part. The clamping control part is configured to change, in a filling step of filling the inside of a mold device with a molding material during clamping, a set value of clamping force from a first set value to a second set value that is larger than the first set value, at a predetermined pressurizing timing in the middle of the filling step. The monitoring part is configured to monitor changes in the actual value of the clamping force due to changes in the set value of the clamping force.

According to one aspect of the present invention, it is possible to estimate the filling state of the molding material by monitoring the changes in the actual value of the clamping force accompanying the changes in the set value of the clamping force. As a result of this, it is possible to provide assistance in setting the timing for increasing the clamping force.

BRIEF DESCRIPTION OF THE DRAWINGS

FIG. 7 is a diagram showing a second example of change in the actual value of clamping force.

DESCRIPTION OF EMBODIMENTS

Figure 1:
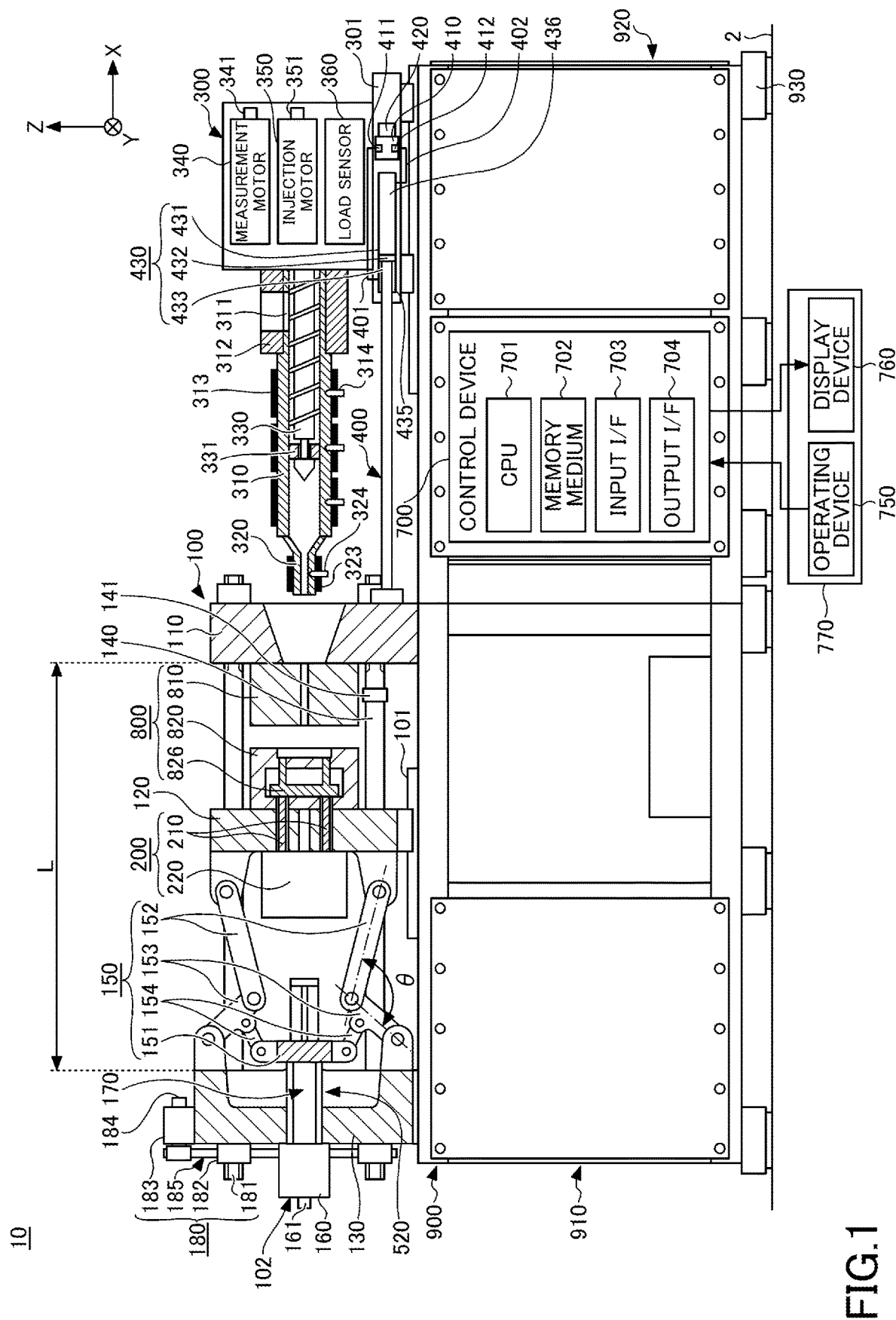
FIG. 1 is a diagram showing a mold of an injection molding machine according to one embodiment as being fully open.

Hereinafter, an embodiment of the present invention will be described with reference to the accompanying drawings. Note that, throughout the drawings, the same reference numerals may be assigned the same or corresponding codes, and the description thereof may be omitted.

Now, there is a technique under study, whereby, in the filling step of filling the inside of a mold device with a molding material during clamping, the set value of clamping force is changed from a first set value to a second set value that is larger than the first set value, at a predetermined pressurizing timing in the middle of the filling step. The occurrence of gas burn can be reduced by setting the clamping force low until the middle of the filling step, and, furthermore, the occurrence of burring can be reduced by setting the clamping force high from the middle of the filling step.

If the timing to increase or pressurize the clamping force is too early, the gas inside the mold device has difficulty escaping to the outside, is compressed inside the mold device, and produces heat, resulting in gas burn. Also, if the timing to increase or pressurize the clamping force is too late, the molding material leaks between the fixed mold and the movable mold, causing burring. Conventionally, the pressurizing timing is set by a skilled worker based on his/her own experience, and it is difficult for a worker other than a skilled worker to set the pressurizing timing.

One aspect of the present invention therefore offers a technique for providing assistance in setting the timing for increasing the clamping force.

(Injection Molding Machine)

Figure 2:
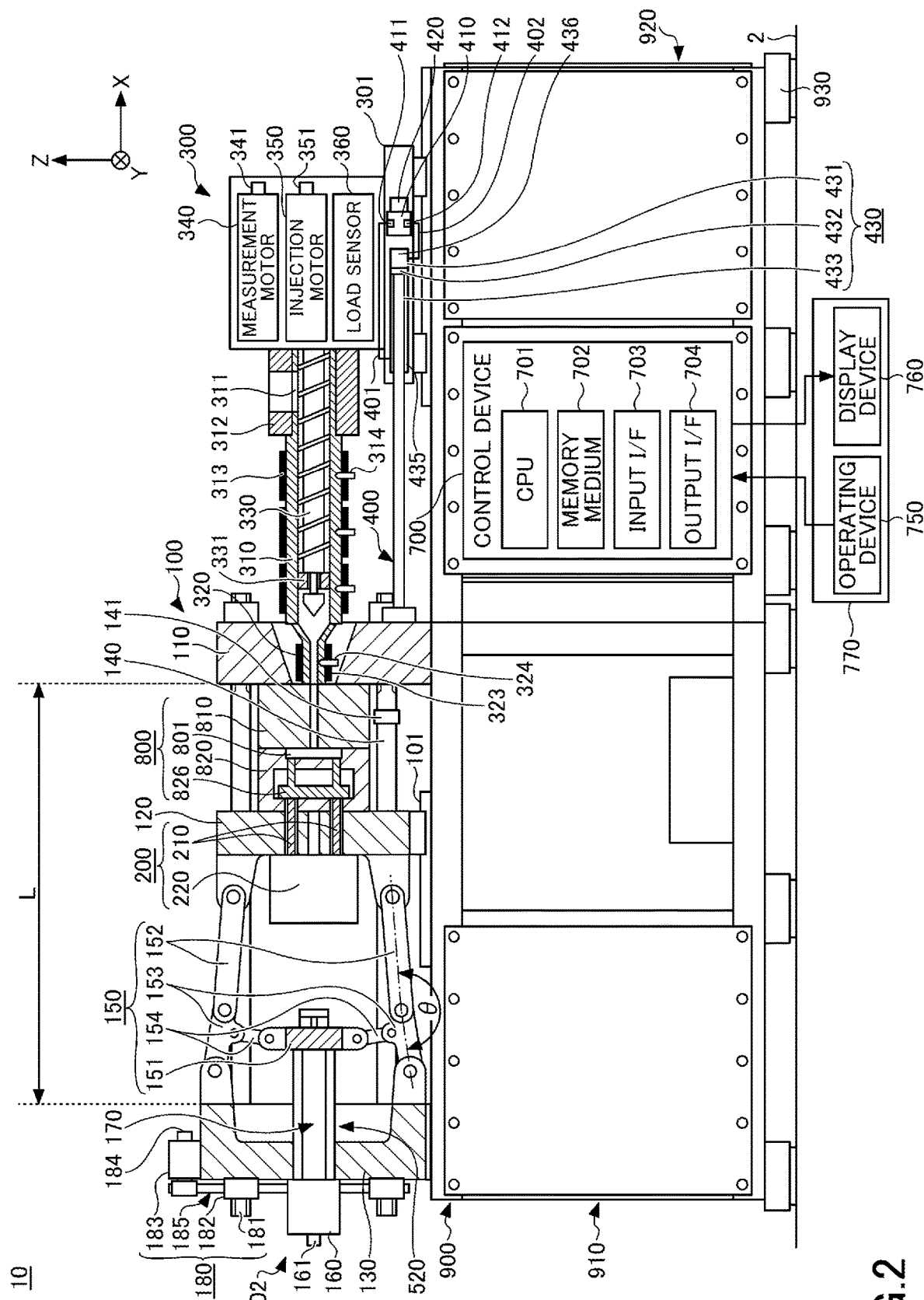
FIG. 2 is a diagram showing the mold of the injection molding machine according to one embodiment as being closed.

FIG. 1 is a diagram showing a state of an injection molding machine when a mold is fully open, according to one embodiment. FIG. 2 is a diagram showing the injection molding machine according to one embodiment, where the mold is clamped. In this specification, the X-axis direction, the Y-axis direction, and the Z-axis direction perpendicular to each other. The X-axis direction and the Y-axis direction represent the horizontal direction, and the Z-axis direction represents the vertical direction. When the clamping device 100 is a horizontal type, the X-axis direction is the direction in which the mold opens and closes, and the Y-axis direction is the width direction of the injection molding machine 10. The negative Y-axis direction side will be hereinafter referred to as "the operating side," and the positive Y-axis direction side will be referred to as "the non-operating side."

As shown in FIG. 1 and FIG. 2, the injection molding machine 10 includes: a clamping device 100 that opens and closes a mold device 800; an ejector device 200 that ejects the molded product molded by the mold device 800; an injection device 300 that injects the molding material into the mold device 800; a move device 400 that moves the injection device 300 forward and backward with respect to the mold device 800; a control device 700 that controls each component of the injection molding machine 10; and a frame 900 that supports each component of the injection molding machine 10. The frame 900 includes: a clamping device frame 910 that supports the clamping device 100; and an injection device frame 920 that supports the injection device 300. The clamping device frame 910 and the injection device frame 920 are each installed on a floor 2 via a leveling adjuster 930. The control device 700 is arranged in the inner space of the injection device frame 920. Each component of the injection molding machine 10 will be described below.

(Clamping Device)

In the description of the clamping device 100, the direction in which the movable platen 120 moves when closing the mold (for example, the positive X-axis direction) will be defined as the front, and the direction in which the movable platen 120 moves when opening the mold (for example, the negative X-axis direction) will be defined as the rear.

The clamping device 100 closes, pressurizes, clamps, depressurizes, and opens the mold device 800. The mold device 800 includes a fixed mold 810 and a movable mold 820.

The clamping device 100 is, for example, a horizontal type, and the direction in which the mold opens and closes is the horizontal direction. The clamping device 100 includes: a fixed platen 110 to which the fixed mold 810 is attached; a movable platen 120 to which the movable mold 820 is fixed; and a move mechanism 102 for moving the movable platen 120 with respect to the fixed platen 110 in the direction in which the mold opens and closes.

A fixed platen 110 is fixed to the clamping device frame 910. A fixed mold 810 is attached to the surface of the fixed platen 110 facing the movable platen 120.

The movable platen 120 is arranged on the clamping device frame 910 so as to be free to move in the direction in which the mold opens and closes. A guide 101 for guiding the movable platen 120 is laid on the clamping device frame 910. The movable mold 820 is attached to the surface of the movable platen 120 facing the fixed platen 110.

The move mechanism 102 moves the movable platen 120 forward and backward with respect to the fixed platen 110, thereby closing, pressurizing, clamping, depressurizing, and opening the mold of the mold device 800. The move mechanism 102 includes: a toggle support 130 that is arranged at a distance with respect to the fixed platen 110; a tie bar 140 that connects the fixed platen 110 and the toggle support 130; a toggle mechanism 150 that moves the movable platen 120 in the direction in which the mold opens and closes, with respect to the toggle support 130; a clamping motor 160 that activates the toggle mechanism 150; a motion conversion mechanism 170 that converts the rotational motion of the clamping motor 160 into linear motion; and a mold thickness adjusting mechanism 180 that adjusts the distance between the fixed platen 110 and the toggle support 130.

The toggle support 130 is provided at a distance from the fixed platen 110, and mounted on the clamping device frame 910 so as to be free to move in the direction in which the mold opens and closes. Note that the toggle support 130 may be arranged so as to be free to move along a guide laid on the clamping device frame 910. The guide for the toggle support 130 may be the same as the guide 101 for the movable platen 120.

Note that, with the present embodiment, the fixed platen 110 is fixed to the clamping device frame 910, and the toggle support 130 is arranged on the clamping device frame 910 so as to be free to move in the direction in which the mold opens and closes. However, it is equally possible to fix the toggle support 130 to the clamping device frame 910, and arrange the fixed platen 110 on the clamping device frame 910 so as to be free to move in the direction in which the mold opens and closes.

The tie bar 140 connects the fixed platen 110 and the toggle support 130 at a distance L in the direction in which the mold opens and closes. A plurality of (for example, four) tie bars 140 may be used here. The multiple tie bars 140 are arranged parallel to the direction in which the mold opens and closes, and extend in accordance with the clamping force. At least one tie bar 140 may be provided with a tie-bar strain sensor 141 that detects the strain of the tie bar 140. The tie-bar strain sensor 141 sends a signal indicating the detection result to the control device 700. The detection result of the tie-bar strain sensor 141 is used to detect the clamping force and the like.

Note that, with the present embodiment, the tie-bar strain sensor 141 is used as a clamping force sensor for detecting the clamping force, but the present invention is by no means limited to this. That is, the clamping force sensor is by no means limited to the strain gauge type, but may be a piezoelectric type, a capacitive type, a hydraulic type, an electromagnetic type, and so forth, and, furthermore, its mounting position is not limited to a tie bar 140 either.

The toggle mechanism 150 is arranged between the movable platen 120 and the toggle support 130, and moves the movable platen 120 in the direction in which the mold opens and closes, with respect to the toggle support 130. The toggle mechanism 150 includes a crosshead 151 that moves in the direction in which the mold opens and closes, and a pair of link sets that bend and stretch as the crosshead 151 moves. Each set of links includes first links 152 and second links 153 which are connected by using pins or the like so as to be free to bend and stretch. The first links 152 are attached to the movable platen 120 with pins or the like so as to be free to swing. The second links 153 are attached to the toggle support 130 with pins or the like so as to be free to swing. The second links 153 are attached to the crosshead 151 via third links 154. When the crosshead 151 is moved forward or backward with respect to the toggle support 130, the first links 152 and the second links 153 bend and stretch, and the movable platen 120 moves forward or backward with respect to the toggle support 130.

Note that the configuration of the toggle mechanism 150 is by no means limited to the configurations shown in FIG. 1 and FIG. 2. For example, although the number of nodes in each set of links is five in FIG. 1 and FIG. 2, this may be four, and one end part of the third link 154 may be connected to a node between a first link 152 and a second link 153.

A clamping motor 160 is attached to the toggle support 130 to activate the toggle mechanism 150. The clamping motor 160 moves the crosshead 151 forward and backward with respect to the toggle support 130, thereby making the first links 152 and the second links 153 bend and stretch, and allowing the movable platen 120 to move forward and backward with respect to the toggle support 130. The clamping motor 160 is directly connected to the motion conversion mechanism 170, but may be connected to the motion conversion mechanism 170 via a belt, a pulley and the like.

The motion conversion mechanism 170 converts the rotational motion of the clamping motor 160 into linear motion of the crosshead 151. The motion conversion mechanism 170 includes a screw shaft, and a screw nut that is screwed into the screw shaft. A ball or a roller may be interposed between the screw shaft and the screw nut.

The clamping device 100 performs a mold-closing step, a pressurizing step, a clamping step, a depressurizing step, a mold-opening step, and so forth, under the control of the control device 700.

In the mold-closing step, the clamping motor 160 is driven to move the crosshead 151 forward at a set moving speed, to the position where the mold is completely closed, thereby moving the movable platen 120 forward and making the movable mold 820 touch the fixed mold 810. The position and moving speed of the crosshead 151 are detected by using, for example, a clamping motor encoder 161 or the like. The clamping motor encoder 161 detects the rotation of the clamping motor 160, and sends a signal indicating the detection result, to the control device 700.

Note that, as for the crosshead position sensor for detecting the position of the crosshead 151 and the crosshead moving speed sensor for detecting the moving speed of the crosshead 151, these are by no means limited to the clamping motor encoder 161, and more general ones can be used. Also, as for the movable platen position sensor for detecting the position of the movable platen 120 and the movable platen moving speed sensor for detecting the moving speed of the movable platen 120, these are by no means limited to the clamping motor encoder 161, and more general ones can be used.

In the pressurizing step, the clamping motor 160 is further driven to move the crosshead 151 farther forward from the position where the mold is completely closed, to the clamping position, thereby generating a clamping force.

In the clamping step, the clamping motor 160 is driven to keep the crosshead 151 at the clamping position. In the clamping step, the clamping force generated in the pressurizing step is maintained. In the clamping step, a cavity space 801 (see FIG. 2) is formed between the movable mold 820 and the fixed mold 810, and the injection device 300 fills the cavity space 801 with a liquid molding material. A molded product is obtained as the filled molding material solidifies.

There may be one cavity space 801 or multiple cavity spaces 801. In the latter case, a plurality of molded products can be obtained at a time. An insert material may be placed in one part of the cavity space 801, and another part of the cavity space 801 may be filled with the molding material. By this means, a molded product in which the insert material and the molding material are integrated as one can be made.

In the depressurizing step, the clamping motor 160 is driven to move the crosshead 151 backward from the clamping position to the position where the mold starts opening, thereby moving the movable platen 120 backward and reducing the clamping force. The position where the mold starts opening and the position where the mold is completely closed may be the same position.

In the mold-opening step, the clamping motor 160 is driven to move the crosshead 151 backward, at a set moving speed, from the position where the mold starts opening to the position where the mold is fully open, thereby moving the movable platen 120 backward and separating the movable mold 820 from the fixed mold 810. Subsequently, the ejector device 200 ejects the molded product from the movable mold 820.

The settings in the mold-opening step, the pressurizing step, and the clamping step are set together as a series of settings. For example, the moving speed, the position, and the clamping force of the crosshead 151 in the mold-opening step and the pressurizing step (including the position where the mold starts closing, the position where the moving speed is switched, the position where the mold is completely closed, and the clamping position) are set together as a series of settings. The position where the mold starts closing, the position where the moving speed is switched, the position where the mold is completely closed, and the clamping position are arrayed in this order, from the rear to the front, and represent the starting and ending points of sections where the moving speed is set. The moving speed is set per section. The moving speed may be switched at one position or may be switched at a number of positions. The position to switch the moving speed need not be set. Either one of the clamping position or the clamping force may be set.

The settings in the depressurizing step and the mold-opening step are set similarly. For example, the moving speed and the position of the crosshead 151 in the depressurizing step and the mold-opening step (including the position where the mold starts opening, the position where the moving speed is switched, and the position where the mold is fully open) are set together as a series of settings. The position where the mold starts opening, the position where the moving speed is switched, and the position where the mold is fully open are arrayed in this order, from the front to the rear, and represent the starting and ending points of sections where the moving speed is set. The moving speed is set per section. The moving speed may be switched at one position or may be switched at a number of positions. The position to switch the moving speed need not be set. The position where the mold starts opening and the position where the mold is completely closed may be the same position. Also, the position where the mold is fully open and the position where the mold begins to close may be the same position.

Note that, instead of the moving speed and the position of the crosshead 151, the moving speed and the position of the movable platen 120 may be set. Also, the clamping force may be set instead of the position of the crosshead (for example, the clamping position) or the position of the movable platen.

Now, the toggle mechanism 150 amplifies the driving force of the clamping motor 160 and sends this to the movable platen 120. The rate of this magnification is also referred to as "toggle magnification." The toggle magnification changes according to an angle $\theta$ that is formed between the first link 152 and the second link 153 (hereinafter also referred to as "link angle $\theta$"). Link angle $\theta$ can be determined from the position of the crosshead 151. The toggle magnification becomes the largest when link angle $\theta$ is 180 degrees.

When the thickness of the mold device 800 changes due to replacement of the mold device 800 or a change in the temperature of the mold device 800, the thickness of the mold is adjusted so that a predetermined clamping force can be obtained when clamping the mold. In adjusting the thickness of the mold, for example, distance L between the fixed platen 110 and the toggle support 130 is adjusted such that link angle $\theta$ in the toggle mechanism 150 becomes a predetermined angle upon mold touch, which is when the movable mold 820 touches the fixed mold 810.

The clamping device 100 includes a mold thickness adjusting mechanism 180. The mold thickness adjusting mechanism 180 adjusts the mold's thickness by adjusting distance L between the fixed platen 110 and the toggle support 130. Note that the time for adjusting the mold's thickness is provided, for example, between the end of a molding cycle and the start of the next molding cycle. The mold thickness adjusting mechanism 180 includes, for example: a screw shaft 181 that is formed in the rear end part of the tie bar 140; a screw nut 182 that is held by the toggle support 130 so as to be free to rotate and unable to move forward and backward; and a mold thickness adjusting motor 183 that rotates the screw nut 182 that is screwed into the screw shaft 181.

A screw shaft 181 and a screw nut 182 are provided for each tie bar 140. The rotational driving force of the mold thickness adjusting motor 183 may be transmitted to a plurality of screw nuts 182 via a rotational drive force transmission part 185. These screw nuts 182 can rotate synchronously. Note that it is also possible to rotate multiple screw nuts 182 individually by changing the transmission path of the rotational drive force transmission part 185.

The rotational drive force transmission part 185 may be composed of gears and the like, for example. In this case, passive gears are formed on the outer periphery of each screw nut 182, a drive gear is attached to the output shaft of the mold thickness adjusting motor 183, and an intermediate gear that meshes with a plurality of passive gears and drive gears is rotatably held in the center part of the toggle support 130. Note that the rotational drive force transmission part 185 may be composed of belts, pulleys, or the like, instead of gears.

The operation of the mold thickness adjusting mechanism 180 is controlled by the control device 700. The control device 700 drives the mold thickness adjusting motor 183 to rotate the screw nut 182. As a result of this, the position of the toggle support 130 with respect to the tie bar 140 is adjusted, and distance L between the fixed platen 110 and the toggle support 130 is adjusted. Note that multiple mold thickness adjusting mechanisms may be used in combination.

The distance L is detected using the mold thickness adjusting motor encoder 184. The mold thickness adjusting motor encoder 184 detects the amount of rotation, the direction of rotation, and so forth of the mold thickness adjusting motor 183, and sends signals indicating these detection results to the control device 700. The detection results of the mold thickness adjusting motor encoder 184 are used to monitor and control the position of the toggle support 130 and distance L. Note that the toggle support position sensor for detecting the position of the toggle support 130 and the distance sensor for detecting distance L are by no means limited to the mold thickness adjusting motor encoder 184, and more general ones can be used.

The clamping device 100 may include a metallic mold temperature adjustor for adjusting the temperature of the mold device 800. The mold device 800 has, in its inside, a channel for a temperature control medium. The metallic mold temperature adjustor adjusts the temperature of the mold device 800 by adjusting the temperature of the temperature control medium supplied to the channel in the mold device 800.

Note that, although the clamping device 100 of this embodiment is a horizontal type in which the mold opens and closes horizontally, the clamping device 100 may also be a vertical type in which the mold opens and closes vertically.

Also, although the clamping motor 160 serves as a drive part in the clamping device 100 of this embodiment, an oil-pressure cylinder may be provided instead of the clamping motor 160. Also, the clamping device 100 may include a linear motor for opening and closing the mold and an electromagnet for clamping the mold.

(Ejector Device)

In the description of the ejector device 200, as in the description of the clamping device 100, the direction in which the movable platen 120 moves when closing the mold (for example, the positive X-axis direction) is defined as the front, and the direction in which the movable platen 120 moves when opening the mold (for example, the negative X-axis direction) is defined as the rear.

The ejector device 200 is attached to the movable platen 120, and moves forward and backward with the movable platen 120. The ejector device 200 includes: an ejector rod 210 for ejecting the molded product from the mold device 800; and a drive mechanism 220 for moving the ejector rod 210 in the direction in which the movable platen 120 moves (the X-axis direction).

The ejector rod 210 is disposed in a through-hole of the movable platen 120 so as to be free to move forward and backward. The front-end part of the ejector rod 210 contacts the ejector plate 826 of the movable mold 820. The front-end part of the ejector rod 210 may or may not be connected with the ejector plate 826.

The drive mechanism 220 includes, for example: an ejector motor; and a motion conversion mechanism that converts the rotational motion of the ejector motor into linear motion of the ejector rod 210. The motion conversion mechanism includes a screw shaft and a screw nut that is screwed into the screw shaft. A ball or a roller may be interposed between the screw shaft and the screw nut.

The ejector device 200 performs an ejection step under the control of the control device 700. In the ejection step, the ejector rod 210 is moved from the standby position to the ejection position at a set moving speed, thereby moving the ejector plate 826 forward and ejecting the molded product. Subsequently, the ejector motor is driven to move the ejector rod 210 backward at a set moving speed, and the ejector plate 826 is moved backward to the original standby position.

The position and moving speed of the ejector rod 210 are detected by using, for example, an ejector motor encoder. The ejector motor encoder detects the rotation of the ejector motor and sends a signal indicating the detection result to the control device 700. Note that the ejector rod position sensor for detecting the position of the ejector rod 210 and the ejector rod moving speed sensor for detecting the moving speed of the ejector rod 210 are by no means limited to an ejector motor encoder, and more general ones can be used.

(Injection Device)

In the following description of the injection device 300, unlike the description of the clamping device 100 and the description of the ejector device 200, the direction in which the screw 330 moves during filling (for example, the negative X-axis direction) will be defined as the front, and the direction in which the screw 330 moves during measurement (for example, the positive X-axis direction) will be defined as the rear.

The injection device 300 is installed on a sliding base 301. The sliding base 301 is arranged so as to be free to move forward and backward with respect to the injection device frame 920. The injection device 300 is arranged to be free to move forward and backward with respect to the mold device 800. The injection device 300 touches the mold device 800, and fills the cavity space 801 in the mold device 800 with the molding material. The injection device 300 includes, for example: a cylinder 310 that heats the molding material; a nozzle 320 provided at the front-end part of the cylinder 310; a screw 330 arranged inside the cylinder 310 so as to be free to move forward and backward and free to rotate; a measurement motor 340 that rotates the screw 330; an injection motor 350 that moves the screw 330 forward and backward; and a load sensor 360 that detects the load transmitted between the injection motor 350 and the screw 330.

The cylinder 310 heats the molding material supplied from a supply port 311. The molding material includes, for example, a resin or the like. The molding material is, for example, formed in pellets, and supplied to the supply port 311 in a solid state. The supply port 311 is formed in the rear part of the cylinder 310. A cooler 312, such as a water-cooled cylinder, is provided in the outer periphery of the rear part of the cylinder 310. A heater 313, such as a band heater and a temperature sensor 314, are provided in the outer periphery of the cylinder 310, on the front side of the cooler 312.

The cylinder 310 is divided into a plurality of zones in the axial direction (for example, the X-axis direction) of the cylinder 310. A first heater 313 and a first temperature sensor 314 are provided in each of these multiple zones. A set temperature is provided in each zone, and the control device 700 controls the first heater 313 such that the temperature detected by the first temperature sensor 314 matches the set temperature.

The nozzle 320 is provided at the front-end part of the cylinder 310 and pressed against the mold device 800. A second heater 323 and a second temperature sensor 324 are provided in the outer periphery of the nozzle 320. The control device 700 controls the second heater 323 such that the detected temperature of the nozzle 320 matches the set temperature.

The screw 330 is provided in the cylinder 310 such that the screw 330 is free to rotate and free to move forward and backward. When the screw 330 rotates, the molding material is sent forward following the spiral threads of the screw 330. The molding material, while being sent forward, is melted gradually by the heat from the cylinder 310. As the liquid molding material is sent in front of the screw 330 and accumulated in front of the cylinder 310, the screw 330 moves backward. Subsequently, when the screw 330 moves forward, the liquid molding material accumulated in front of the screw 330 is injected from the nozzle 320 and fills the inside of the mold device 800.

A backflow preventing ring 331 is attached to the front part of the screw 330 such that the backflow preventing ring 331 is free to move forward and backward. The backflow preventing ring 331 serves as a backflow preventing valve for preventing the backflow of the molding material when the screw 330 is pushed forward and the molding material is sent from the front to the rear.

When the screw 330 moves forward, the backflow preventing ring 331 is pushed backward by the pressure of the molding material that is located in front of the screw 330, and moves backward relative to the screw 330, to a blocking position (see FIG. 2) where the backflow preventing ring 331 blocks the channel of the molding material. By this means, the molding material accumulated in front of the screw 330 is prevented from flowing backward.

Meanwhile, when the screw 330 rotates, the backflow preventing ring 331 is pushed forward by the pressure of the molding material that is sent forward along the spiral threads of the screw 330, and moves forward relative to the screw 330 up to the open position, which is where the channel for the molding material opens up (see FIG. 1). By this means, the molding material is sent to the front side of the screw 330.

The backflow preventing ring 331 may be either a co-rotating type that rotates with the screw 330 or a non-co-rotating type that does not rotate with the screw 330.

Note that the injection device 300 may include a drive source that makes the backflow preventing ring 331 move forward and backward between the open position and the closed position, with respect to the screw 330.

The measurement motor 340 makes the screw 330 rotate. The drive source for rotating the screw 330 is by no means limited to the measurement motor 340, and may be, for example, an oil-pressure pump or the like.

The injection motor 350 makes the screw 330 move forward and backward. Between the injection motor 350 and the screw 330, a motion conversion mechanism for converting the rotational motion of the injection motor 350 into linear motion of the screw 330, and the like is provided. The motion conversion mechanism includes, for example, a screw shaft, and a screw nut that is screwed into the screw shaft. A ball, a roller, or the like may be provided between the screw shaft and the screw nut. The drive source for making the screw 330 move forward and backward is by no means limited to the injection motor 350, and, for example, an oil-pressure cylinder or the like may be used.

The load sensor 360 detects the load that is transmitted between the injection motor 350 and the screw 330. The detected load is converted into pressure in the control device 700. The load sensor 360 is provided on the transmission path of the load between the injection motor 350 and the screw 330, and detects the load that acts on the load sensor 360. The load sensor 360 sends a signal indicating the detection result to the control device 700. The load detected by the load sensor 360 is converted into pressure that acts between the screw 330 and the molding material, and used to control or monitor the pressure the screw 330 receives from the molding material, the back pressure upon the screw 330, the pressure acting on the molding material from the screw 330, and so forth.

Note that the pressure sensor for detecting the pressure of the molding material is by no means limited to the load sensor 360, and more general ones can be used as well. For example, a nozzle pressure sensor or an inner-mold pressure sensor may be used. The nozzle pressure sensor may be installed in the nozzle 320. The inner-mold pressure sensor may be installed in the mold device 800.

The injection device 300 performs a measurement step, a filling step, a pressure-holding step, and so forth, under the control of the control device 700. The filling step and the pressure-holding step may be also collectively referred to as an "injection step."

In the measurement step, the measurement motor 340 is driven to rotate the screw 330 at a number of rotations per unit time according to the settings, and the molding material is sent forward following the spiral threads of the screw 330. Accompanying this, the molding material melts gradually. As the liquid molding material is sent in front of the screw 330 and accumulated in front of the cylinder 310, the screw 330 moves backward. The number of rotations of the screw 330 per unit time is detected by using, for example, a measurement motor encoder 341. The measurement motor encoder 341 detects the rotation of the measurement motor 340, and sends a signal indicating the detection result to the control device 700. Note that the screw rotation speed sensor for detecting the number of rotations of the screw 330 per unit time is by no means limited to the measurement motor encoder 341, and more general ones can be used as well.

In the measurement step, the injection motor 350 may be driven to apply a back pressure determined by the settings to the screw 330, so as to prevent the screw 330 from moving backward too suddenly. The back pressure upon the screw 330 is detected by using, for example, the load sensor 360. When the screw 330 moves back to the position where the measurement ends and a predetermined amount of molding material is accumulated in front of the screw 330, the measurement step is completed.

The position and number of rotations of the screw 330 per unit time are set together as a series of settings. For example, the position where the measurement is started, the position where the number of rotations per unit time is switched, and the position where the measurement is completed are set. These positions are arrayed in this order from the front to the rear, and represent the starting points and the ending points of sections where the number of rotations per unit time is set. The number of rotations per unit time is set per section. The number of rotations per unit time may be switched at one position or may be switched at a number of positions. The position to switch the number of rotations per unit need not be set. Also, the back pressure is set per section.

In the filling step, the injection motor 350 is driven to move the screw 330 forward at a set moving speed. The cavity space 801 in the mold device 800 is filled with the liquid molding material accumulated in front of the screw 330. The position and moving speed of the screw 330 are detected by using, for example, an injection motor encoder 351. The injection motor encoder 351 detects the rotation of the injection motor 350 and sends a signal indicating the detection result to the control device 700. When the position of the screw 330 reaches a set position, the filling step switches to the pressure-holding step (this switching is commonly referred to as "V/P switchover"). The position where V/P switchover takes place is also referred to as the "V/P switchover position." The set moving speed of the screw 330 may be changed depending on the position of the screw 330, the time, and so forth.

The position and the moving speed of the screw 330 in the filling step are set together as a series of settings. For example, the position where the filling is started (also referred to as "the injection-starting position"), the position to switch the moving speed, and the V/P switchover position are set. These positions are arranged in this order, from the rear to the front, and represent the starting points and ending points of sections where the moving speed is set. The moving speed is set per section. The moving speed may be switched at one position or may be switched at a number of positions. The position to switch the moving speed need not be set.

In every section in which the moving speed of the screw 330 is set, the upper limit value of pressure for the screw 330 is set. The pressure of the screw 330 is detected by the load sensor 360. When the pressure of the screw 330 is less than or equal to a set pressure, the screw 330 is moved forward at the set moving speed. On the other hand, when the pressure of the screw 330 is greater than the set pressure, the screw 330 is moved forward at a moving speed slower than the set moving speed, such that the pressure of the screw 330 becomes less than or equal to the set pressure, in order to protect the mold.

Note that, when the position of the screw 330 arrives at the V/P switchover position during the filling step, the screw 330 may be temporarily stopped at the V/P switchover position, and V/P switchover may be carried out later. Shortly before the V/P switchover, the screw 330 may be moved forward or backward at a low speed, instead of stopping. Also, as for the screw position sensor for detecting the position of the screw 330 and the screw moving speed sensor for detecting the moving speed of the screw 330, these are by no means limited to the injection motor encoder 351, and more general ones can be used.

In the pressure-holding step, the injection motor 350 is driven to push the screw 330 forward, the pressure on the molding material in the front-end part of the screw 330 (hereinafter also referred to as the "holding pressure") is kept at a set pressure, and the molding material that remains in the cylinder 310 is pushed toward the mold device 800. By this means, the shortage of the molding material due to cooling-induced contraction inside the mold device 800 can be replenished. The holding pressure is detected by using, for example, the load sensor 360. The set value of the holding pressure may be changed in accordance with the time elapsed since the start of the pressure-holding step, and so forth. The holding pressure and the time to keep the holding pressure in the pressure-holding step may be set multiple in number, and may be set together as a series of settings.

In the pressure-holding step, the molding material in the cavity space 801 in the mold device 800 gradually cools down, and, when the pressure-holding step is completed, the inlet of the cavity space 801 is sealed with the solidified molding material. This state is referred to as "gate seal," and the backflow of the molding material from the cavity space 801 is prevented therewith. After the pressure-holding step, the cooling step is started. In the cooling step, the molding material in the cavity space 801 is solidified. The measurement step may be performed during the cooling step, so as to reduce the time cycle of molding.

Note that, although the injection device 300 of this embodiment employs an in-line screw method, a pre-plunger method or the like may be employed as well. The pre-plunger-type injection device supplies the molding material melted in a plasticized cylinder, to an injection cylinder, and injects the molding material from the injection cylinder into the mold device. A screw is provided in the plasticized cylinder so as to be free to rotate, or free to rotate and move forward and backward. Meanwhile, a plunger is provided inside the injection cylinder, free to move forward and backward.

Also, although the injection device 300 of this embodiment is a horizontal type in which the axial direction of the cylinder 310 is horizontal, the injection device 300 may be a vertical type in which the axial direction of the cylinder 310 is vertical. The clamping device to be combined with a vertical injection device 300 may be vertical or horizontal. Similarly, the clamping device to be combined with a horizontal injection device 300 may be horizontal or vertical.

(Move Device)

In the description of the move device 400, as in the above description of the injection device 300, the direction in which the screw 330 moves during filling (for example, the negative X-axis direction) is the front, and the direction in which the screw 330 moves during measurement (for example, the positive X-axis direction) is the rear.

The move device 400 allows the injection device 300 to move forward and backward with respect to the mold device 800. Also, the move device 400 presses the nozzle 320 against the mold device 800 to generate a nozzle touch pressure. The move device 400 includes: a liquid-pressure pump 410; a motor 420 to serve as a drive source; a liquid-pressure cylinder 430 to serve as a liquid-pressure actuator; and so forth.

The liquid-pressure pump 410 has a first port 411 and a second port 412. The liquid-pressure pump 410 is a pump that can rotate in both directions, and, by switching the direction of rotation of the motor 420, the liquid-pressure pump 410 sucks in the hydraulic fluid (for example, oil) from one of the first port 411 and the second port 412 and discharges it from the other one, thereby generating a hydraulic pressure. The liquid-pressure pump 410 can also suck in the hydraulic fluid from a tank and discharge it from one of the first port 411 and the second port 412.

The motor 420 makes the liquid-pressure pump 410 operate. The motor 420 drives the liquid-pressure pump 410 in the direction of rotation, and with rotational torque, in accordance with control signals from the control device 700. The motor 420 may be an electric motor or an electric servo motor.

The liquid-pressure cylinder 430 includes a cylinder body 431, a piston 432, and a piston rod 433. The cylinder body 431 is fixed to the injection device 300. The piston 432 divides the inside of the cylinder body 431 into a front chamber 435 that serves as a first chamber, and a rear chamber 436 that serves as a second chamber. The piston rod 433 is fixed to the fixed platen 110.

The front chamber 435 of the liquid-pressure cylinder 430 is connected with the first port 411 of the liquid-pressure pump 410 via a first channel 401. The hydraulic fluid discharged from the first port 411 is supplied to the front chamber 435 via the first channel 401, pushing the injection device 300 forward. As the injection device 300 moves forward, the nozzle 320 is pressed against the fixed mold 810. The front chamber 435 functions as a pressure chamber that generates a nozzle touch pressure of the nozzle 320 by using the pressure of the hydraulic fluid supplied from the liquid-pressure pump 410.

Meanwhile, the rear chamber 436 of the liquid-pressure cylinder 430 is connected with the second port 412 of the liquid-pressure pump 410 via a second channel 402. The hydraulic fluid discharged from the second port 412 is supplied to the rear chamber 436 of the liquid-pressure cylinder 430 via the second channel 402, pushing the injection device 300 backward. As the injection device 300 moves backward, the nozzle 320 is separated from the fixed mold 810.

Note that, although the move device 400 according to the present embodiment includes the liquid-pressure cylinder 430, the present invention is by no means limited to this. For example, it is possible to use an electric motor and a motion conversion mechanism that converts the rotational motion of the electric motor into linear motion of the injection device 300, instead of using the liquid-pressure cylinder 430.

(Control Device)

The control device 700 is composed of a computer, and, as shown in FIG. 1 and FIG. 2, includes: a CPU (Central Processing Unit) 701; a memory medium 702 such as a memory; an input interface 703; and an output interface 704. The control device 700 causes the CPU 701 to execute programs stored in the memory medium 702, and performs various controls. Also, the control device 700 receives signals from the outside via the input interface 703, and sends signals to the outside via the output interface 704.

The control device 700 repeats the measurement step, the mold-closing step, the pressurizing step, the clamping step, the filling step, the pressure-holding step, the cooling step, the depressurizing step, the mold-opening step, the ejection step, and so forth, thereby repeatedly manufacturing the molded product. The series of operations for having a molded product is also referred to as a "shot" or a "molding cycle." This includes, for example, the operation from the start of the measurement step, up to the start of the next measurement step. Also, the time required for one shot is also referred to as a "molding cycle time" or a "cycle time."

One molding cycle is composed of, for example, a measurement step, a mold-closing step, a pressurizing step, a clamping step, a filling step, a pressure-holding step, a cooling step, a depressurizing step, a mold-opening step, and an ejection step, performed in this order. This order is the order of starting each step. The filling step, the pressure-holding step, and the cooling step are performed during the clamping step. The start of the clamping step may match the start of the filling step. Also, the end of the depressurizing step may match the start of the mold-opening step.

Note that multiple steps may be performed simultaneously in order to shorten the molding cycle time. For example, the measurement step may be performed during the cooling step in the previous molding cycle, or during the clamping step. In this case, the mold-closing step may be performed at the beginning of the molding cycle. Also, the filling step may be started during the mold-closing step. The ejection step may be started during the mold-opening step. When an on-off valve for opening and closing the channel of the nozzle 320 of the injection device 300 is provided, the mold-opening step may be started during the measurement step. This is because, even if the mold-opening step is started during the measurement step, the molding material does not leak from the nozzle 320 as long as the channel of the nozzle 320 is closed by the on-off valve.

Note that one molding cycle may include steps other than the measurement step, the mold-closing step, the pressurizing step, the clamping step, the filling step, the pressure-holding step, the cooling step, the depressurizing step, the mold-opening step, and the ejection step.

For example, after completing the pressure-holding step and before starting the measurement step, a pre-measurement suck-back step may be performed, in which the screw 330 is moved backward to a pre-configured measurement starting position. In this case, the pressure of the molding material accumulated in front of the screw 330 can be reduced before the measurement step is started, so that the screw 330 can be prevented from moving backward too suddenly at the start of the measurement step.

Also, after completing the measurement step and before starting the filling step, a post-measurement suck-back step may be performed, in which the screw 330 is moved backward to a pre-configured filling starting position (also referred to as the "injection starting position"). In this case, the pressure of the molding material accumulated in front of the screw 330 can be reduced before the filling step is started, so that the molding material is prevented from leaking from the nozzle 320 before the filling step is started.

The control device 700 is connected to an operating device 750 that receives the user's input operations, and a display device 760 that displays a screen. The operating device 750 and the display device 760 may be set with a touch panel 770, for example, and may be integrated with the touch panel 770. The touch panel 770, when serving as a display device 760, displays a screen under the control of the control device 700. The screen of the touch panel 770 may display information such as, for example, the settings of the injection molding machine 10, the current state of the injection molding machine 10, and so forth. Also, on the screen of the touch panel 770, for example, operating parts such as buttons for receiving the user's input operations, input fields, and the like may be displayed. The touch panel 770, when serving as an operating device 750, detects the user's input operations on the screen, and outputs signals corresponding to the input operations to the control device 700. By this means, for example, the user can check the information displayed on the screen, and operate the operating parts displayed on the screen to, for example, set up the injection molding machine 10 (including inputting values for the settings). Also, since the user operates the operating parts provided on the screen, the injection molding machine 10 is able to operate in accordance with the operating parts. Note that the operation of the injection molding machine 10 may be, for example, the operation (including a stop) of the clamping device 100, the ejector device 200, the injection device 300, the move device 400, and so forth. Also, the operation of the injection molding machine 10 may be, for example, switching of the screen displayed on the touch panel 770 serving as the display device 760. Note that, although the operating device 750 and the display device 760 of the present embodiment are described as integrated in a touch panel 770, they may be provided separately as well. Also, multiple operating devices 750 may be provided. The operating device 750 and the display device 760 are positioned on the operating side (the negative Y-axis direction) of the clamping device 100 (to be more specific, the fixed platen 110).

(Detail of Control Device)

Figure 3:
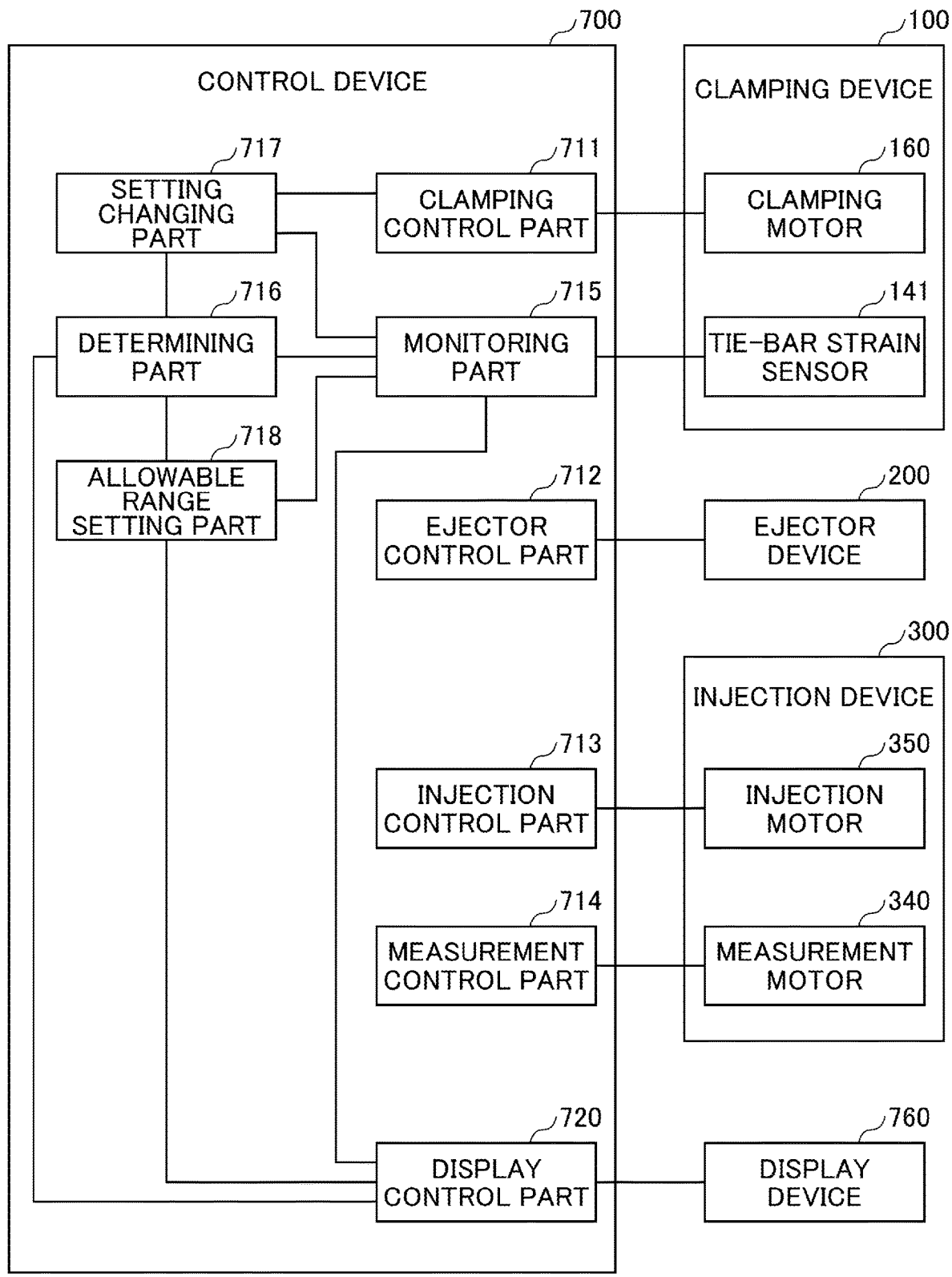
FIG. 3 is a diagram showing examples of components of a control device in functional blocks.

Next, examples of components of the control device 700 will be described with reference to FIG. 3. Note that the functional blocks shown in FIG. 3 are simply conceptual, and do not necessarily have to be physically configured as illustrated. All or part of the functional blocks can be functionally or physically distributed or integrated in arbitrary units. All or part of the processing functions performed by each functional block are implemented by programs executed by the CPU. Alternatively, each functional block may be implemented as hardware by wired logic.

Figure 4:
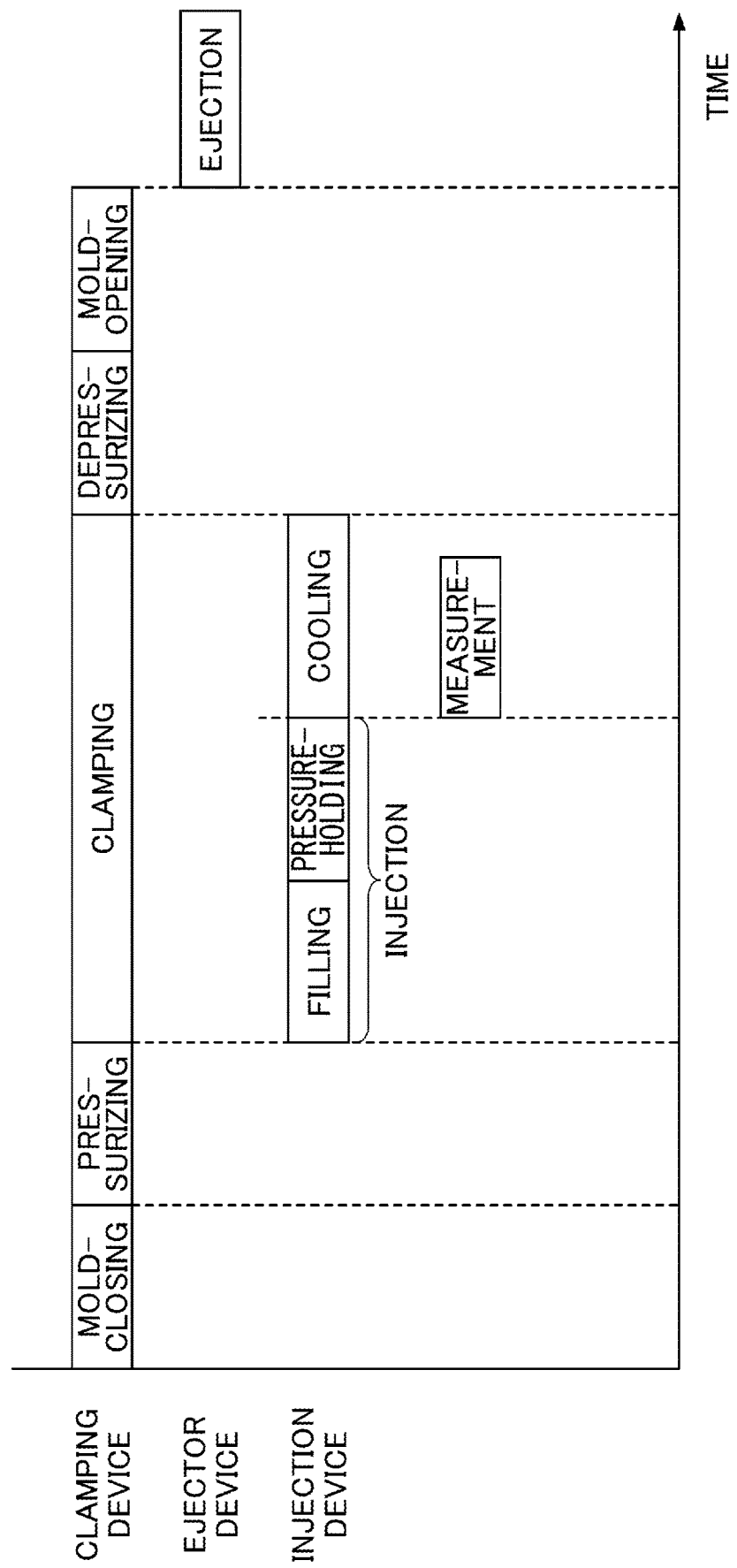
FIG. 4 is a diagram showing examples of processes in a molding cycle.

As shown in FIG. 3, the control device 700 includes, for example, a clamping control part 711, an ejector control part 712, an injection control part 713, and a measurement control part 714. The clamping control part 711 controls the clamping device 100 to perform the mold-closing step, the pressurizing step, the clamping step, the depressurizing step and the mold-opening step shown in FIG. 4. The clamping drive source is, for example, the clamping motor 160, but may be an oil-pressure cylinder and the like as well. The ejector control part 712 controls the ejector device 200 to perform the ejection step. The injection control part 713 controls the injection drive source of the injection device 300 to perform the injection step. The injection drive source is, for example, an injection motor 350, but an oil-pressure cylinder or the like may be used as well. The injection step includes the filling step and the pressure-holding step. The injection step is performed during the clamping step. The measurement control part 714 controls the measurement drive source of the injection device 300 to perform the measurement step. The measurement drive source is, for example, a measurement motor 340, but an oil-pressure pump or the like may be used as well. The measurement step is performed during the cooling step.

In the filling step, the injection drive source is controlled so that the actual value of the moving speed of the injection member provided inside the cylinder 310 matches the set value. In the filling step, the injection member is moved forward so as to fill the inside of the mold device 800 with the liquid molding material accumulated in front of the injection member. The injection member is, for example, a screw 330 (see FIG. 1 and FIG. 2), but a plunger may be used as well.

The moving speed of the injection member is detected by using a speed sensor. The speed sensor is, for example, an injection motor encoder 351. In the filling step, as the injection member moves forward, the pressure to act on the molding material from the injection member increases (hereinafter this pressure will be referred to as the "filling pressure"). The filling step may include pausing the injection member, or retracting the injection member, shortly before the pressure-holding step.

In the pressure-holding step, the injection drive source is controlled so that the actual value of the filling pressure matches the set value. In the pressure-holding step, the shortage of the molding material due to cooling-induced contraction in the mold device 800 is replenished by pushing the injection member forward. The filling pressure is detected by using a pressure sensor such as the load sensor 360. A nozzle pressure sensor or an inner-mold pressure sensor may be used as the pressure sensor.

Figure 5:
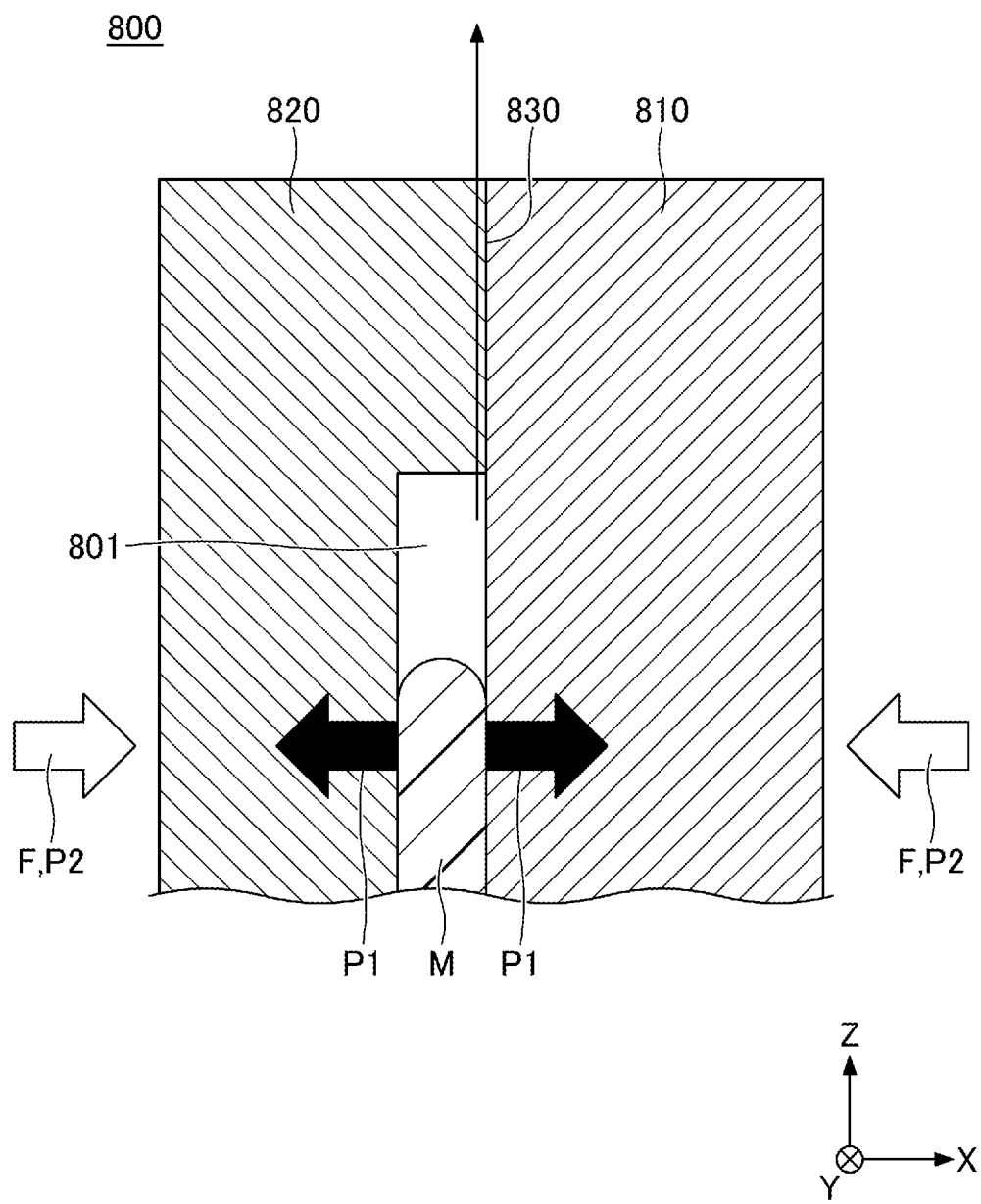
FIG. 5 is a cross-sectional view showing an example of a molding material that flows into a mold device.

Next, an example of the molding material M that flows into the mold device 800 will be described with reference to FIG. 5. The molding material M is, for example, resin. The molding material M flows into the cavity space 801 inside the mold device 800. The cavity space 801 is formed at a parting surface 830 of the fixed mold 810 and the movable mold 820. The parting surface 830 is commonly referred to as a "parting line."

When filling pressure P1 is greater than a clamping pressure P2, the fixed mold 810 and the movable mold 820 open, and molding material M leaks. As a result of this, a defect referred to as "burring" occurs. Burring refers to a phenomenon in which molding material M leaks between the fixed mold 810 and the movable mold 820 and solidifies. To prevent burr from forming, the fixed mold 810 and the movable mold 820 are clamped by a clamping force F. Note that clamping pressure P2 is the value obtained by dividing clamping force F by an area S of the parting surface 830 (P2=F/S).

However, when molding material M flows into the cavity space 801 while clamping pressure P2 and clamping force F are too large, the gas inside the cavity space 801 has difficulty escaping to the outside via the parting surface 830. As a result of this, a defect referred to as "gas burn" occurs. Gas burn refers to a phenomenon in which the gas in the cavity space 801 is compressed, produces heat, and carbonizes molding material M. When gas burn occurs, the gas in the cavity space 801 cannot go out of the mold device 800 smoothly and tends to remain in the cavity space 801, and therefore a defect referred to as "short shots" might also occur. A "short shot" refers to a phenomenon in which molding material M cools down and solidifies before filling the entire cavity space 801.

After being injected by the injection device 300, molding material M passes through the sprue (not shown) of the fixed mold 810 and so forth, and flows into the cavity space 801 formed between the fixed mold 810 and the movable mold 820. Until the tip of the flow of molding material M reaches the parting surface 830 of the fixed mold 810 and the movable mold 820, the fixed mold 810 and the movable mold 820 do not open and no burr is formed, even if clamping force F is low.

In order to reduce the occurrence of both burring and gas burn, the clamping control part 711 may change the set value for clamping force F from a first set value F1 (F1>0) to a second set value F2 (F2>F1), which is larger than first set value F1, at a pressurizing timing that is set in advance in the middle of the filling step. The occurrence of gas burn can be reduced by setting clamping force F low until the middle of the filling step, and the occurrence of burring can be reduced by setting clamping force F high from the middle of the filling step. By setting clamping force F low up until the middle of the filling step, it is possible not only to reduce the occurrence of gas burn but also to reduce the occurrence of short shots.

The pressurizing timing of clamping force F is set based on, for example, the position of the injection member. The injection member is moved forward after the filling step is started. The position of the injection member is detected by using a position sensor. The position sensor is, for example, the injection motor encoder 351. When the position of the injection member reaches a setting position (hereinafter also referred to as the "clamping force switching position"), the set value of clamping force F is changed from first set value F1 to second set value F2.

The further the clamping force switching position is moved forward, the later the pressurizing timing is set. Since the pressurizing timing is set in the middle of the filling step, the position to switch the clamping force is set ahead of the position where the filling is started, and behind the V/P switchover position. Note that the pressurizing timing may be set based on the time elapsed since the filling step started. When the elapsed time reaches a setting time, the set value of clamping force F is changed from first set value F1 to second set value F2.

Now, if the timing for increasing or pressurizing clamping force F is set too early, it is difficult for the gas inside the mold device 800 to escape to the outside, and the gas is compressed inside the mold device 800, produces heat, and causes gas burn. Also, if the pressurizing timing of clamping force F is set too late, molding material M leaks between the fixed mold 810 and the movable mold 820, and burr is formed. Conventionally, a skilled worker sets this pressurizing timing based on his/her own experience, and it is difficult for a non-skilled worker to set the pressurizing timing.

As shown in FIG. 3, the control device 700 includes a monitoring part 715. As the set value of clamping force F changes, the monitoring part 715 monitors the changes in the actual value of clamping force F. When the set value of clamping force F is changed, the actual value of clamping force F also changes, and so the monitoring part 715 has only to monitor the subsequent changes. The monitoring part 715 uses a clamping force sensor such as the tie-bar strain sensor 141 to determine the actual value of clamping force F. Although the details will be described later, the filling state of molding material M can be estimated from the changes in the actual value of clamping force F. Therefore, monitoring the changes in the actual value of clamping force F can provide assistance in setting the pressurizing timing.

The clamping control part 711 converts, for example, the set value of clamping force F into a set value of the crosshead position, and controls the clamping motor 160 so that the actual value of the crosshead position matches the set value. First set value F1 and second set value F2 of clamping force F are converted into a first set value and a second set value of the crosshead position. The crosshead position is the position of the crosshead 151 relative to the toggle support 130. Clamping force F becomes larger as the crosshead 151 moves further forward.

When molding material M reaches the parting surface 830 of the fixed mold 810 and the movable mold 820 and the fixed mold 810 and the movable mold 820 are opened by filling pressure P1, distance L between the fixed platen 110 and the toggle support 130 becomes longer. An increase in distance L means that the tie bars 140 are extended, and that the actual value of clamping force F is increasing. Therefore, the filling state of molding material M can be estimated from the changes in the actual value of clamping force F.

Figure 6:
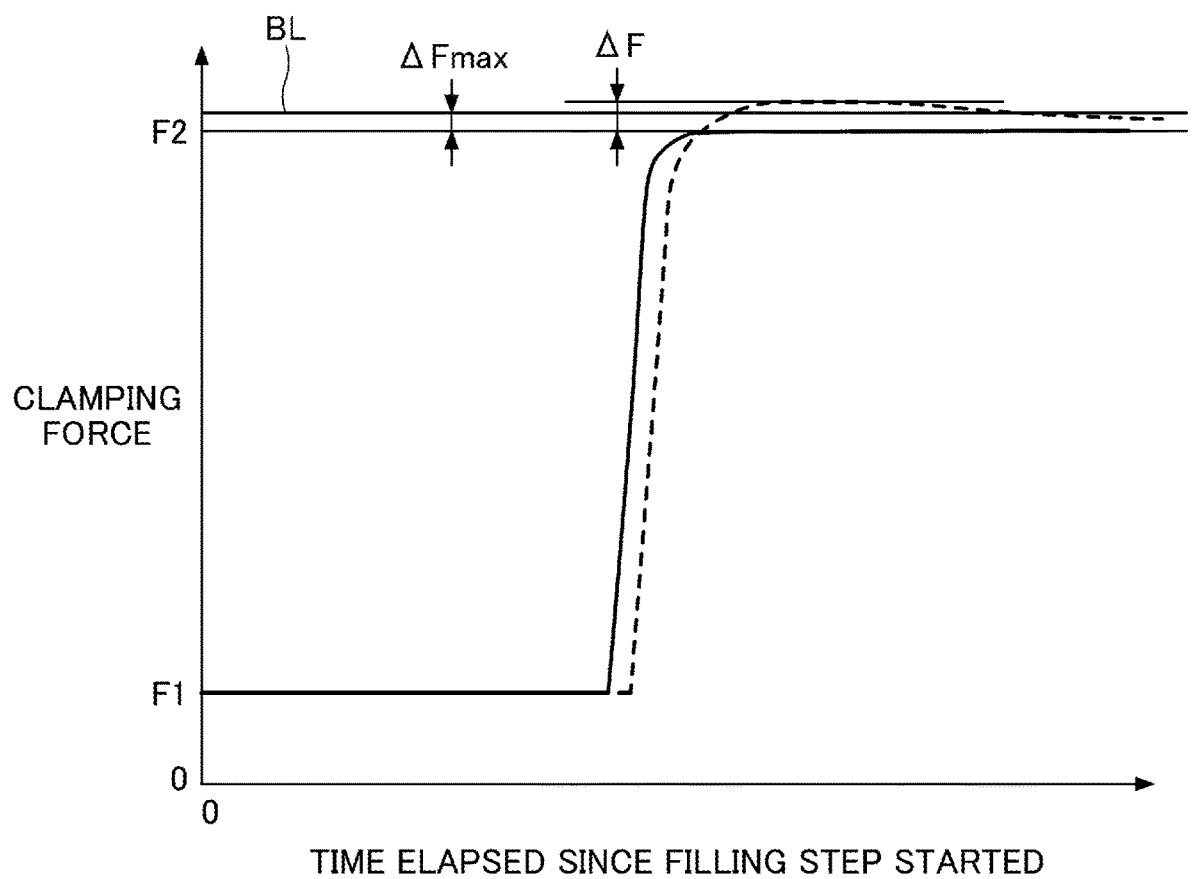
FIG. 6 is a diagram showing a first example of change in the actual value of clamping force.

As shown in FIG. 3, the control device 700 may include a determining part 716. The determining part 716 determines whether or not the pressurizing timing is adequate, based on changes in the actual value of clamping force F monitored by the monitoring part 715. For example, the determining part 716 determines the adequacy of the pressurizing timing based on whether or not an overshoot ΔF (see FIG. 6) of the actual value with respect to a second set value F2 is equal to or less than an upper limit value ΔFmax. In FIG. 6, the solid line shows the change in the actual value when ΔF is ΔFmax or less, and the dashed line shows the change in actual value when ΔF exceeds ΔFmax.

Note that, after the set value of clamping force F is changed from first set value F1 to second set value F2, although the actual value of clamping force F is stabilized at second set value F2 in FIG. 6, the actual value of clamping force F might in some cases be stabilized at F2', which is a value shifted from second set value F2 (F2'=F2+E (where E is a numerical value other than zero)). In the latter case, F2' is used instead of F2 as a reference value for overshoot ΔF. The determining part 716 determines the adequacy of the pressurizing timing based on whether or not overshoot ΔF of the actual value with respect to a predetermined reference value (for example, F2 or F2') is equal to or less than an upper limit value ΔFmax. Error E is, for example, the error that is produced when converting the set value of clamping force F into a set value of the crosshead position, and the error that is produced due to changes in the dimensions of the mold device 800 caused by temperature changes, and so forth.

Upper limit value ΔFmax is set so as not to cause burring. If the pressurizing timing is too late, clamping pressure P2, when molding material M reaches the parting surface 830 of the fixed mold 810 and the movable mold 820, is smaller than filling pressure P1, and therefore the fixed mold 810 and the movable mold 820 open wide. As a result of this, overshoot ΔF (ΔF>0) exceeds upper limit value ΔFmax, and burr is formed.

Note that, even if the fixed mold 810 and the movable mold 820 open up, as long as the size of the opening is small, molding material M, which is viscous, does not leak, and burr is not formed. Upper limit value ΔFmax is set for each mold device 800, for example. The setting of upper limit value ΔFmax can be changed. For example, the worker may set upper limit value ΔFmax manually by entering numbers in an input column on a screen. Alternatively, the control device 700 may detect whether or not there is burr by using an image of a molded product, and set upper limit value ΔFmax automatically based on the result of detection.

Once overshoot ΔF exceeds upper limit value ΔFmax, the size of the opening between the fixed mold 810 and the movable mold 820 becomes large and burr is formed, and therefore the determining part 716 determines that the pressurizing timing is inadequate. On the other hand, when overshoot ΔF is equal to or less than upper limit value ΔFmax, the size of the opening between the fixed mold 810 and the movable mold 820 is small and burr is not formed, so that the determining part 716 determines that the pressurizing timing is adequate.

Note that, with this embodiment, the determining part 716 determines the adequacy of the pressurizing timing, but the worker himself/herself may determine the adequacy of the pressurizing timing as well. That is, although the adequacy of the pressurizing timing is determined automatically with this embodiment, the adequacy of the pressurizing timing may be determined manually as well. When determining the adequacy of the pressurizing timing manually, for example, the display control part 720 of the control device 700 (see FIG. 3) may display the results of monitoring by the monitoring part 715 on the display device 760.

The worker can judge the adequacy of the pressurizing timing by looking at the results of monitoring by the monitoring part 715 displayed on the display device 760. The contents to be displayed on the display device 760 may include, for example, the waveform of the actual values of clamping force F and a border line BL indicating upper limit value ΔFmax (see FIG. 6). Alternatively, the contents to be displayed on the display device 760 may also include overshoot ΔF. Overshoot ΔF may be displayed in numerical values, or only whether overshoot ΔF exceeds upper limit value ΔFmax or not may be displayed.

As shown in FIG. 3, the control device 700 may include a setting-changing part 717. The setting-changing part 717 changes the setting of the pressurizing timing based on changes in the actual value of clamping force F monitored by the monitoring part 715. For example, the setting-changing part 717 changes the pressurizing timing setting such that overshoot ΔF is equal to or less than upper limit value ΔFmax. If overshoot ΔF exceeds upper limit value ΔFmax, the setting-changing part 717 changes the pressurizing timing setting so as to advance the pressurizing timing. The pressurizing timing setting may be changed by a fixed amount, or may be changed by an amount to match overshoot ΔF. In the latter case, the larger overshoot ΔF, the larger the amount by which the setting of the pressurizing timing may be changed. The setting-changing part 717 may repeat changing the pressurizing timing setting so as to advance the pressurizing timing until overshoot ΔF is equal to or less than upper limit value ΔFmax.

The setting-changing part 717 may repeat changing the pressurizing timing setting, measure overshoot ΔF at each pressurizing timing, and set the slowest pressurizing timing in the range in which overshoot ΔF is equal to or less than upper limit value ΔFmax, as the next pressurizing timing. By this means, it is possible to set the pressurizing timing as late as possible while reducing the occurrence of burring, and reduce the occurrence of gas burn. As a result of this, the pressurizing timing, which could only be set by experienced workers in the past, can now be set automatically.

When repeating changing the pressurizing timing setting, the setting-changing part 717 may repeat changing the pressurizing timing setting so as to advance the pressurizing timing, or the setting-changing part 717 may repeat changing the pressurizing timing setting so as to delay the pressurizing timing. That is, the setting-changing part 717 may both change and advance the pressurizing timing setting and change and delay the pressurizing timing setting. In any case, the slowest pressurizing timing in the range in which overshoot ΔF is equal to or less than upper limit value ΔFmax may be set as the next pressurizing timing.

Changing the setting of the pressurizing timing so as to advance the pressurizing timing may include, for example, changing the setting of the clamping force switching position to a later position. On the other hand, changing the setting of the pressurizing timing so as to delay the pressurizing timing may include, for example, changing the setting of the clamping force switching position to an earlier position. The pressurizing timing may be set based on the time elapsed since the filling step started, instead of the clamping force switching position, as described above.

The setting-changing part 717 may change the pressurizing timing setting in the (n+1)-th and subsequent molding cycles based on, for example, overshoot ΔF in the n-th molding cycle (where n is a natural number equal to or greater than 1). By this means, in the (n+1)-th and subsequent molding cycles, it is possible to set the pressurizing timing as late as possible, while reducing the occurrence of burring, and also reduce the occurrence of gas burn.

Note that, with this embodiment, the setting-changing part 717 changes the setting of the pressurizing timing, but the worker himself/herself may change the pressurizing timing setting as well. In other words, although the pressurizing timing setting is changed automatically in this embodiment, the pressurizing timing setting may be changed manually as well.

For example, the worker may change the pressurizing timing setting by looking at the results of monitoring by the monitoring part 715 displayed on the display device 760. This change of setting may be made as the worker enters the pressurizing timing in an input column on a screen. The worker may repeat changing the pressurizing timing setting, and measure overshoot ΔF for each pressurizing timing. The worker may input the slowest pressurizing timing in the range in which overshoot ΔF is equal to or less than upper limit value ΔFmax, in an input column on a screen, as the pressurizing timing from the next time onward.

Next, a modification of FIG. 6 will be described below with reference to FIG. 7. As shown in the dashed line in FIG. 6, in the above embodiment, when the pressurizing timing is late, the actual value of clamping force F exceeds second set value F2, and subsequently becomes smaller toward second set value F2. This is because clamping pressure P2 (P2=F2/S) is greater than filling pressure P1, and therefore the fixed mold 810 and the movable mold 820 close after they open.

On the other hand, with this modification, as shown by solid and broken lines in FIG. 7, the actual value of clamping force F exceeds second set value F2, then shifts from second set value F2, and stays constant as is. This is because clamping pressure P2 (P2=F2/S) is smaller than filling pressure P1, and therefore the fixed mold 810 and the movable mold 820 do not close after they are open.

Note that, when the actual value of clamping force F exceeds second set value F2 and then decreases toward second set value F2, the technique of this modification may be applied. This is because reference timing t0, which will be described later, indicates the timing at which molding material M reaches the parting surface 830, regardless of how large or small second set value F2 is.

Similarly, when the actual value of clamping force F exceeds second set value F2, then shifts from second set value F2, and stays constant as is, the technique of the above embodiment can be applied. This is because the adequacy of the pressurizing timing can be determined from overshoot ΔF, regardless of the behavior after second set value F2 reaches the maximum value.

The determining part 716 of this modification determines the adequacy of the pressurizing timing based on whether the reaching timing, that is, the timing at which the actual value of clamping force F reaches second set value F2, is within an allowable range Δt. Allowable range Δt has a lower limit value and an upper limit value. Although allowable range Δt has width and its lower limit value and upper limit value are different, allowable range Δt may be a point, and its lower limit value and upper limit value may be the same. Allowable range Δt may be set manually, or may be set by the allowable range setting part 718 shown in FIG. 3. Hereinafter, the reaching timing at which the actual value of clamping force F reaches second set value F2 is simply referred to as "reaching timing."

Note that, after the set value of clamping force F changes from first set value F1 to second set value F2, the actual value of clamping force F stabilizes at second set value F2 in FIG. 7. However, in some cases, the actual value of clamping force F might stabilize at value F2', which is a value shifted from second set value F2 (F2'=F2+E (where error E is a number other than zero)). In the latter case, the timing at which the actual value of clamping force F reaches F2' may be used as the reaching timing. The determining part 716 determines the adequacy of the pressurizing timing based on whether the reaching timing, at which the actual value of clamping force F reaches a predetermined reference value (for example F2 or F2'), is within allowable range Δt. Error E is, for example, the error that is produced when converting the set value of clamping force F into a set value of the crosshead position, the error that is produced due to changes in the dimensions of the mold device 800 caused by temperature changes, and so forth.

The allowable range setting part 718 sets allowable range Δt based on timing t0, which is when the actual value of clamping force F stabilizes at a reference value (for example, F2 or F2') and subsequently starts shifting from the reference value, as shown by the solid line in FIG. 7. Hereinafter, timing t0, at which the actual value of clamping force F stabilizes at a reference value and subsequently starts shifting from the reference value will be referred to as "reference timing t0." Reference timing t0 represents the timing when molding material M reaches the parting surface 830, which will be described later.

When the pressurizing timing is early as shown by the solid line in FIG. 7, the actual value of clamping force F stabilizes at the reference value (for example, F2 or F2') until molding material M reaches the parting surface 830 between the fixed mold 810 and the movable mold 820. Subsequently, when molding material M reaches the parting surface 830, the fixed mold 810 and the movable mold 820 begin to open due to filling pressure P1, and the actual value of clamping force F starts shifting from the reference value toward a higher value. Note that the size of the opening between the fixed mold 810 and the movable mold 820 is adjusted so as not cause burring.

Note that, when molding material M reaches the parting surface 830, the actual value of clamping force F might start shifting from the reference value toward a lower value. Such cases include, for example, when the center of the mold device 800 or the cavity space 801 is eccentric with respect to the center of the fixed platen 110 or the movable platen 120. In this case, when molding material M reaches the parting surface 830, the strain on some of the tie bars 140 might be alleviated, and the tensile stress acting on some of the tie bars 140 might decrease. As a result of this, the detection value on the tie-bar strain sensor 141 might become smaller, and the actual value of clamping force F might become smaller.

Therefore, reference timing t0 represents the timing at which molding material M reaches the parting surface 830. As shown in FIG. 7, for example, the allowable range setting part 718 may set allowable range Δt to include timing t0. Allowable range Δt may include timing t0 as a median value, but may include timing t0 as an upper limit value or as a lower limit value. Furthermore, allowable range Δt need not include timing t0, and may be set, for example, as a range earlier than timing t0.

Allowable range Δt may be set for each mold device 800, for example. The setting of allowable range Δt can be changed. Note that allowable range Δt can be set without using reference timing t0. For example, the control device 700 may detect whether or not there is burr and gas burn by using an image of a molded product, and automatically set allowable range Δt based on that detection result. Also, the worker may set allowable range Δt manually by checking whether or not there are burr and gas burn with his/her own eyes and entering numerical values in an input column on a screen.

As shown by the dashed line in FIG. 7, when the reaching timing is within allowable range Δt, it is possible to set the pressurizing timing so as to delay the pressurizing timing as much as possible, while reducing the occurrence of burring, and also reduce the occurrence of gas burn. Therefore, when the reaching timing is within allowable range Δt, the determining part 716 determines that the pressurizing timing is adequate. On the other hand, if the reaching timing is not within allowable range Δt, the determining part 716 determines that the pressurizing timing is inadequate.

Note that, with this embodiment, the determining part 716 determines the adequacy of the pressurizing timing, but the worker himself/herself may determine the adequacy of the pressurizing timing as well. That is, although the adequacy of the pressurizing timing is determined automatically with this embodiment, the adequacy of the pressurizing timing may be determined manually as well. When determining the adequacy of the pressurizing timing manually, for example, the display control part 720 of the control device 700 (see FIG. 3) may display the results of monitoring by the monitoring part 715 on the display device 760.

The worker can determine the adequacy of the pressurizing timing by looking at the results of monitoring by the monitoring part 715 displayed on the display device 760. The contents to be displayed on the display device 760 may include, for example, the waveform of the actual values of clamping force F, the reaching timing, and allowable range Δt (see FIG. 7). Alternatively, the contents to be displayed on the display device 760 may simply include whether or not the reaching timing is within allowable range Δt.

The setting-changing part 717 according to this modification changes the setting of the pressurizing timing so that the reaching timing is within allowable range Δt. If the reaching timing is earlier than allowable range Δt, the setting-changing part 717 changes the pressurizing timing setting so as to delay the pressurizing timing. On the other hand, if the reaching timing is later than allowable range Δt, the setting-changing part 717 changes the pressurizing timing setting so as to advance the pressurizing timing. The setting of the pressuring timing may be changed by a fixed amount, or may be changed by an amount to match the amount of shift between the reaching timing and allowable range Δt. In the latter case, the larger the amount of shift between the reaching timing and allowable range Δt, the larger the amount by which the setting of the pressurizing timing may be changed.

The setting-changing part 717 may repeat changing the setting of the pressurizing timing setting until the reaching timing is within an allowable range. By this means, it is possible to set the pressurizing timing as late as possible while reducing the occurrence of burring, and reduce the occurrence of gas burn. As a result of this, the pressurizing timing, which could only be set by experienced workers in the past, can now be set automatically.

The setting-changing part 717 may change the pressurizing timing setting in the (n+1)-th and subsequent molding cycles based on, for example, the reaching timing in the n-th molding cycle (where n is a natural number equal to or greater than 1). By this means, in the (n+1)-th and subsequent molding cycles, it is possible to set the pressurizing timing as late as possible, while reducing the occurrence of burring, and also reduce the occurrence of gas burn.

Note that, with this embodiment, the setting-changing part 717 changes the setting of the pressurizing timing, but the worker himself/herself may change the pressurizing timing setting as well. In other words, although the pressurizing timing setting is changed automatically in this embodiment, the pressurizing timing setting may be changed manually as well.

For example, the worker may change the pressurizing timing setting by looking at the results of monitoring by the monitoring part 715 displayed on the display device 760. This change of setting may be made as the worker enters the pressurizing timing in an input column on a screen. The worker may repeat changing the pressurizing timing setting, and measure the reaching timing for each pressurizing timing. The worker may input a pressurizing timing at which the reaching timing is within allowable range Δt, in an input column on a screen, as the pressurizing timing from the next time onward.

Although embodiments of the control device for an injection molding machine and the control method for the injection molding machine according to the present invention have been described above, the present invention is not limited to the above embodiments. Various changes, modifications, substitutions, additions, deletions, and combinations are possible within the scope of the claims. These also naturally belong to the technical scope of the present invention.

What is claimed is:

1. A control device for an injection molding machine, the control device comprising:
a processor configured to:
change, in a filling step of filling an inside of a mold device with a molding material during clamping, a set value of clamping force from a first set value to a second set value that is larger than the first set value, at a predetermined pressurizing timing in a middle of the filling step;
monitor a change in an actual value of the clamping force due to a change in the set value of the clamping force,
determine adequacy of the predetermined pressurizing timing based on the change in the actual value of the clamping force monitored by the processor, and
adjust the predetermined pressurizing timing based on a determination of the adequacy of the predetermined pressurizing timing.

2. The control device for the injection molding machine according to claim 1, wherein the processor determines the adequacy of the pressurizing timing based on an overshoot of the actual value of the clamping force with respect to a predetermined reference value.

3. The control device for the injection molding machine according to claim 1, wherein the processor determines the adequacy of the pressurizing timing based on a reaching timing, at which the actual value of the clamping force reaches a predetermined reference value.

4. The control device for the injection molding machine according to claim 3, wherein the processor is further configured to set an allowable range based on a timing at which the actual value of the clamping force starts shifting from the predetermined reference value after the actual value of the clamping force stabilizes at the predetermined reference value and determines the adequacy of the pressurizing timing where the reaching timing, at which the actual value of the clamping force reaches a predetermined reference value, is within the allowable range.

5. The control device for the injection molding machine according to claim 1, wherein the processor displays a result of the determination of the adequacy of the predetermined pressurizing timing on a display device after determining the adequacy of the predetermined pressurizing timing.

6. A control device for an injection molding machine, the control device comprising:
a processor configured to:
change, in a filling step of filling an inside of a mold device with a molding material during clamping, a set value of clamping force from a first set value to a second set value that is larger than the first set value, at a predetermined pressurizing timing in a middle of the filling step;
monitor a change in an actual value of the clamping force due to a change in the set value of the clamping force; and
set a setting value for changing a setting of the pressurizing timing based on the change in the actual value of the clamping force due to the change in the set value of the clamping force monitored by the monitoring part.

7. The control device for the injection molding machine according to claim 6, wherein the processor changes the setting of the pressurizing timing based on an overshoot of the actual value of the clamping force with respect to a predetermined reference value.

8. The control device for the injection molding machine according to claim 7, wherein the processor repeats changing the setting of the pressurizing timing, measures the overshoot for each pressurizing timing, and changes the pressurizing timing based on a pressurizing timing that satisfies a predetermined condition among a plurality of pressurizing timings.

9. The control device for the injection molding machine according to claim 6, wherein the processor changes the setting of the pressurizing timing based on a reaching timing at which the actual value of the clamping force satisfies a predetermined condition.

10. The control device for the injection molding machine according to claim 9, wherein the processor repeats changing the setting of the pressurizing timing until the reaching timing satisfies a predetermined condition of the reaching timing.

11. The control device for an injection molding machine according to claim 9, wherein the processor is further configured to set an allowable range based on a timing when the actual value starts to deviate from a predetermined reference value after it becomes stable at the predetermined reference value, and change the setting of the pressurizing timing upon determining whether the reaching timing at which the actual value of the clamping force satisfies the predetermined condition is within the allowable range.

12. A control device for an injection molding machine, the control device comprising:
a processor configured to;
change, in a filling step of filling an inside of a mold device with a molding material during clamping, a set value of clamping force from a first set value to a second set value that is larger than the first set value, at a predetermined pressurizing timing in a middle of the filling step; and
monitor a change in an actual value of the clamping force due to a change in the set value of the clamping force; and
display a result of monitoring by the processor on a display device,
wherein the processor is further configured to display on the display device a waveform of the actual value of the clamping force and an upper limit value of an overshoot amount of the actual value with respect to a predetermined reference value.

13. A control method for an injection molding machine, the control method comprising:
   in a filling step of filling an inside of a mold device with a molding material during clamping, changing a set value of clamping force from a first set value to a second set value that is larger than the first set value, at a predetermined pressurizing timing in a middle of the filling step;
   monitoring a change in an actual value of the clamping force due to a change in the set value of the clamping force,
   determining adequacy of the predetermined pressurizing timing based on the change in the actual value of the clamping force monitored by the monitoring, and
   adjusting the predetermined pressurizing timing based on a determination of the adequacy of the predetermined pressurizing timing.

14. A control device for an injection molding machine, the control device comprising:
   a processor that is configured to:
      change, in a filling step of filling an inside of a mold device with a molding material during clamping, a set value of clamping force from a first set value to a second set value that is larger than the first set value, at a predetermined pressurizing timing in a middle of the filling step;
      monitor a change in an actual value of the clamping force due to a change in the set value of the clamping force, and
      display a result of monitoring by the processor on a display device,
   wherein the processor is further configured to display, on the display device, a waveform of the actual value of the clamping force and an allowable range of timing at which the actual value satisfies a predetermined condition.

* * * * *